United States Patent [19]
Hashimoto et al.

[11] Patent Number: 5,143,957
[45] Date of Patent: Sep. 1, 1992

[54] SOLID GOLF BALLS REINFORCED WITH ANHYDROUS METAL SALTS OF ALPHA, BETA-ETHYLENICALLY UNSATURATED CARBOXYLIC ACIDS

[75] Inventors: Takatsugu Hashimoto, Tokyo; Yoshinori Egashira, Iruma; Takeshi Kinoshita, Tokorozawa City, all of Japan

[73] Assignee: Bridgestone Corporation, Tokyo, Japan

[21] Appl. No.: 647,080

[22] Filed: Jan. 29, 1991

[51] Int. Cl.$^5$ .................. C08K 5/09; A63B 37/06
[52] U.S. Cl. .................. 524/397; 273/218; 273/220; 524/908; 525/273; 525/274
[58] Field of Search .............. 524/399, 400, 908, 533, 524/397; 273/62, 218, 220; 525/273, 274

[56] References Cited

U.S. PATENT DOCUMENTS

| | | | |
|---|---|---|---|
| 3,823,122 | 7/1974 | Schuh et al. | 260/85.1 |
| 4,056,269 | 11/1977 | Pollitt et al. | 273/218 |
| 4,065,537 | 12/1977 | Miller et al. | 264/143 |
| 4,082,288 | 4/1978 | Martin et al. | 273/218 |
| 4,082,288 | 4/1978 | Martin et al. | 273/218 |
| 4,100,182 | 7/1978 | Martin et al. | 260/429.9 |
| 4,141,559 | 2/1979 | Melvin et al. | 273/220 |
| 4,191,671 | 3/1980 | Kataoka et al. | 260/23.7 |
| 4,192,790 | 3/1980 | McKinstry et al. | 260/31.2 |
| 4,266,772 | 5/1981 | Martin et al. | 273/218 |
| 4,495,326 | 1/1985 | Donatelli et al. | 524/533 |
| 4,500,466 | 2/1985 | Hayes et al. | 260/429.9 |
| 4,501,866 | 2/1985 | Roggeman et al. | 526/133 |
| 4,529,770 | 7/1985 | Hayes et al. | 524/445 |
| 4,546,980 | 10/1985 | Gendreau et al. | 273/218 |
| 4,616,048 | 10/1986 | DeTrano et al. | 523/166 |
| 4,688,801 | 8/1987 | Reiter et al. | 273/218 |
| 4,713,409 | 12/1987 | Hayes et al. | 524/518 |
| 4,715,607 | 12/1987 | Llort et al. | 273/218 |
| 4,720,526 | 1/1988 | Roland et al. | 525/273 |
| 4,726,590 | 2/1988 | Molitor | 273/220 |
| 4,770,422 | 9/1988 | Issac | 524/908 |
| 4,929,678 | 5/1990 | Hamada et al. | 525/301 |
| 4,955,613 | 9/1990 | Gendreau et al. | 524/908 |
| 4,971,329 | 11/1990 | Llort et al. | 524/908 |
| 4,974,852 | 12/1990 | Hiraoka et al. | 524/908 |
| 4,990,570 | 2/1991 | Saito et al. | 525/254 |

FOREIGN PATENT DOCUMENTS 63223048  9/1988  Japan .

Primary Examiner—Paul R. Michl
Assistant Examiner—Peter Szekely
Attorney, Agent, or Firm—Frank J. Troy, Sr.

[57] ABSTRACT

Solid golf balls comprise a vulcanizable rubber and a reinforcing filler comprising an essentially anhydrous metal salt of an $\alpha,\beta$-ethylenically unsaturated carboxylic acid. Golf balls containing such reinforcing fillers have improved physical properties over rubber compounds containing conventional metal carboxylic acid salts. Additionally, the rubber compounds have improved processability and shorter curing time.

12 Claims, No Drawings

SOLID GOLF BALLS REINFORCED WITH ANHYDROUS METAL SALTS OF ALPHA, BETA-ETHYLENICALLY UNSATURATED CARBOXYLIC ACIDS

TECHNICAL FIELD

The present invention provides solid golf balls utilizing metal salts of $\alpha,\beta$-ethylenically unsaturated carboxylic acids as a reinforcement. Such metal salts have been added to rubber compositions heretofore in order to improve certain physical properties of the rubber such as tensile strength and modulus. The salts of the present invention have a unique crystalline structure that is essentially anhydrous or contains a substantial quantity of anhydrous structure and which has been found herein to produce improved properties in solid golf balls.

BACKGROUND OF THE INVENTION

The use of various organic acid metal salts as a reinforcing filler in golf balls is well known and has been described in numerous patents. Rubber compounds containing these salts exhibit high hardness and good rebound. One particularly useful salt is zinc dimethacrylate which is prepared from methacrylic acid. Preparation of this and other salts often provides essentially completely hydrated forms which are less effective than the salts of the present invention.

Processes are also known for preparing the salt in situ during mixing with the rubber compound; however, there are many disadvantages. For instance, processability is not good because methacrylic acid is a liquid and it is corrosive, requiring the use of special equipment. Also, it is necessary to remove water, produced as a by-product; long mixing times are required; curing times are longer and, the properties of the compounds are variable because reaction control is difficult in situ.

With respect to the patent literature, U.S. Pat. No. 4,082,288, for instance, relates to the preparation of basic zinc methacrylate by milling under agitation methacrylic acid with a suspension of zinc oxide in a liquid medium such as water or a volatile organic liquid.

U.S. Pat. No. 4,100,182 relates to a method for preparing an adjuvant for an elastomeric composition which involves mixing methacrylic acid with zinc oxide in a liquid medium in the proportions required to form basic zinc methacrylate, removing the liquid medium and finely dividing the resulting reaction product. The reference teaches that the liquid medium may be water or a volatile organic liquid such as a hydrocarbon liquid or an alkanol.

In U.S. Pat. No. 4,500,466, owned by the Assignee of record herein, a method is provided for the preparation of zinc methacrylate powder involving the reaction of zinc oxide and methacrylic acid in a liquid aliphatic hydrocarbon such as hexane. Using this method, one obtains a mixture of the anhydrous structure as well as the hydrated structure.

Despite the existence of metal salts of carboxylic acids and their widespread use in rubber polymer compounds for a variety of products including golf balls, the present invention provides a novel form of such salts as a reinforcing filler. These salts provide superior physical properties in solid golf balls provided therewith.

DISCLOSURE OF THE INVENTION

It is, therefore, an object of the present invention to provide solid golf balls containing reinforcing fillers comprising anhydrous metal salts of $\alpha,\beta$-ethylenically unsaturated carboxylic acids.

It is another object of the present invention to provide solid golf balls having improved physical properties.

It is another object of the present invention to provide solid golf balls from vulcanizable rubber compounds having improved processability and that have faster cure times.

In general, solid golf balls are provided which comprise a vulcanizable rubber and from about 5 to 100 parts by weight of a reinforcing filler comprising an essentially anhydrous metal salt of an $\alpha,\beta$-ethylenically unsaturated carboxylic acid, per 100 parts of rubber.

These and other objects of the present invention together with the advantages thereof over existing metal salts, which shall become apparent from the specification which follows, are accomplished by the invention as hereinafter described and claimed.

PREFERRED EMBODIMENT FOR CARRYING OUT THE INVENTION

The present invention is directed toward solid golf balls exhibiting superior performance such as greater hardness and higher velocity. These and other advantages are obtained by employing a metal salt of an $\alpha,\beta$-ethylenically unsaturated carboxylic acid, such as zinc dimethacrylate, that is anhydrous or substantially anhydrous. It has recently been found that anhydrous zinc dimethacrylate provides a crystalline structure consisting essentially of plates and some fibers, detected by transmission electron microscopy (TEM). Zinc dimethacrylate prepared in aqueous media is hydrated and provides a crystalline structure containing needles and powder. When prepared in an aliphatic hydrocarbon solvent, as described in U.S. Pat. No. 4,500,466, both crystalline structures are present. That is, the product comprises a mixture of plates and fibers (anhydrous form) and needles and powdered or amorphous structure (hydrated form). A more detailed discussion of the two structures, is presented in copending application U.S. Ser. No. 509,278, the subject matter of which is incorporated herein by reference.

While it is known to employ zinc dimethacrylate as a reinforcing filler for solid golf balls, such salts have been prepared in water or other polar media and are hydrated. It has now been found that when the salt is anhydrous or at least is rich in the anhydrous form, not only is processability improved, but superior performance is obtained in solid golf balls reinforced thereby, as compared with metal salts of the hydrated form.

Rubbers or rubbery polymers with which the anhydrous metal salts of the present invention can be reinforced for the manufacture of golf balls include natural rubber, ethylene propylene rubber (EPR), ethylene propylene diene rubber (EPDM), nitrile rubber, neoprene, diene rubbers, copolymers of a conjugated diene and at least one monoolefin and blends thereof. The copolymers of conjugated dienes may be derived from conjugated dienes such as 1,3-butadine, 2-methyl-1,3-butadiene(isoprene), 2,3-dimethyl-1,3-butadiene, 1,3-pentadiene, 1,3-hexadiene and the like, as well as mixtures of the foregoing dienes. The preferred conjugated diene is 1,3-butadine and the preferred rubber is high cis 1,4-polybutadiene and/or natural rubber.

The copolymers may be derived from various monoolefinic monomers including vinyl aromatic monomers such as styrene, alpha-methyl styrene, vinyl naphthalene, vinyl pyridine and the like; alkyl acrylates or methacrylates such as methyl acrylate, ethyl acrylate, butyl acrylate, methyl methacrylate, butyl methacrylate and the like; unsaturated nitriles such as acrylonitrile, methacrylonitrile and the like and vinyl halides such as vinyl chloride, vinylidene chloride and the like as well as mixtures of the foregoing monoolefins. The copolymers may contain up to 50 percent by weight of the monoolefin based upon the total weight of copolymer. The preferred copolymer is a copolymer of a conjugated diene, especially butadiene, and a vinyl aromatic hydrocarbon, especially styrene.

The above-described copolymers of conjugated dienes and their method of preparation are well known in the rubber and polymer arts. Many of the polymers and copolymers are commercially available.

In general, the metal salts are derived from the reaction of a metal selected from the group consisting of zinc, iron (II) and copper (II) as well as alkaline earth metals such as magnesium and calcium and an $\alpha,\beta$-ethylenically unsaturated carboxylic acid having from about 3 to 30 carbon atoms, preferably acrylic acid or methacrylic acid. Particularly preferred is zinc dimethacrylate.

In order to obtain the anhydrous zinc dimethacrylate consisting essentially of plate, crystalline structure, an organic salt of zinc, or other metal for a metal carboxylate salt, is reacted with the $\alpha,\beta$-ethylenically unsaturated carboxylic acid in an organic hydrocarbon solvent. Particularly preferred are the aliphatics, such as hexane. The organic moiety of the metal salt is selected from the group consisting of aliphatics having from 1 to about 6 carbon atoms, with diethyl zinc being particularly preferred.

In the preparation of zinc dimethacrylate via the reaction of diethyl zinc and methacrylic acid, the byproduct is ethane so an anhydrous product is obtained. Alternatively zinc oxide can be reacted with methacrylic acid, to produce a product that is partially hydrated but is rich in the anhydrous form.

As an example of the preparation of anhydrous zinc dimethacrylate, diethyl zinc is reacted with methacrylic acid in an amount of from about 0.5 to about 0.6 moles of diethyl zinc per mole of methacrylic acid in a volatile organic liquid hydrocarbon.

While not essential, it is generally preferred to include a small amount of a nonionic surfactant in the dispersion medium as this aids in producing a fluid suspension which is pumpable and pourable. Various well known nonionic surfactants can be utilized for that purpose including silicone type surfactants and alkylaryl polyether alcohol types. Preferred nonionic surfactants are the alkylaryl polyether alcohols.

Amounts of nonionic surfactant included in the dispersion medium may range from about 0.1 to about 1.0 percent, preferably 0.3 to 0.5 percent by weight based on the combined weight of zinc oxide and methacrylic acid.

The reaction is preferably conducted at room or ambient temperatures, i.e., no added heat, under agitation and in the presence of the nonionic surfactant. This reaction procedure produces a fluid suspension which as indicated above is both pumpable and pourable. If desired, the reaction can be conducted at temperatures of up to about 70° C. and without a surfactant. In this latter case, a slurry or thick paste is obtained which does not pour well. While this procedure is not preferred, it does not appear to degrade the finished product.

Reaction times may vary considerably depending on factors such as batch size, degree of agitation and the like. In general, reaction times may range from about 4 to about 20 hours or more.

In the preferred embodiment, as the reaction nears completion, the product takes on the form of a fluid suspension of zinc dimethacrylate particles in the liquid medium, whereas when the reaction is conducted at higher temperatures and without surfactant, the product takes on the form of a slurry of zinc dimethacrylate particles in the liquid medium.

In any event, the next step is to recover the particles of zinc dimethacrylate from the liquid medium. This can be accomplished by any convenient method. Thus, for example, the zinc dimethacrylate particles may be recovered by filtration (which is preferred) or by removal of the liquid medium as by evaporation. When the zinc dimethacrylate particles are recovered by filtration, it is often desirable and preferred to remove additional portions of the liquid medium by pressing the particles.

Following the recovery step, the zinc dimethacrylate particles are dried to produce the zinc dimethacrylate powder. Drying can be accomplished by any conventional method. Thus, air drying and/or vacuum drying can be utilized. It is often preferred to first air dry the particles and then vacuum dry in an oven at temperatures of from about 60° C. to about 70° C. An alternate preparation utilizing zinc oxide and methacrylic acid, as set forth in U.S. Pat. No. 4,500,466 yields a product rich in the anhydrous form.

The amount of the metal salt of the present invention that can be added to the rubber ranges generally from about 5 to 100 parts by weight, per 100 parts of rubber (phr) preferably about 10 to 70 parts by weight and most preferably about 20 to 60 parts by weight, depending somewhat upon which of the foregoing types of salt is selected. Where the salt comprises a mixture of hydrous and anhydrous forms, the latter should be in the majority, comprising at least about 90 weight percent of the mixture. Hence, the term "essentially" anhydrous as used herein refers to salts having at least about 90 percent anhydrous structure.

The metal salts of the present invention can be added to the rubber during compounding by general compounding techniques, such as dry mixing, or other known to those skilled in the art. Alternatively, it can be added as a suspension in an organic solvent to a polymer cement, formed by preparing the desired polymer in an organic solvent. Such a process is described in greater detail in copending application, U.S. Ser. No. 509,277.

The polymer compounds containing the metal salts of the present invention are cured with peroxides. Peroxide curing agents which may be used in the compositions include organic peroxides such as dicumyl peroxide, bis-(t-butyl peroxy) diisopropyl benzene, t-butyl perbenzoate, di-t-butyl peroxide, 2,5-dimethyl2,5-di-t-butyl peroxide-hexane and the like. The preferred peroxide curing agents are bis-(t-butyl peroxy)-diisopropyl benzene and dicumyl peroxide.

Amounts of peroxide curing agents included in the compositions will depend upon the type of rubber utilized and may broadly be stated as cure effective amounts. In general, such amounts may range from about 0.2 to about 10 parts by weight per 100 parts by weight of rubbery polymer.

The compositions may optionally contain other additives commonly utilized in rubber compositions such as process and extender oils, antioxidants, waxes, zinc oxide, calcium carbonate, barium sulfate and the like. Additionally, fillers or mixtures of fillers can be used in amounts of from about 30 to about 70 parts by weight per 100 parts by weight of rubbery polymer.

One commercial method of preparing a golf ball formulation is the in situ method in which zinc oxide and methacrylic acid are mixed directly into the polymer and the zinc oxide and methacrylic acid react in situ to form zinc dimethacrylate salt. This procedure involves a long mixing time, special mixing equipment (because of the corrosive nature of methacrylic acid) and some variability of the mix quality and compounded properties. Following this procedure, 100 parts by weight of polymer was added to the mixer, then 13.7 parts by weight of zinc oxide followed by 26.3 parts by weight of methacrylic acid. This mixture was then placed on a two-roll mill and the curing agent (Dicup 40C, 2 phr) was added and mixed for three minutes. The final mix was then placed in the mold and cured at 170° C.

In order to demonstrate practice of the present invention, a high cis 1,4-polybutadiene rubber from Japanese Synthetic Rubber (JSR), and zinc dimethacrylate (ZDMA) were mixed in an ordinary laboratory kneader type mixer for 6 to 10 minutes or mixed on a two-roll mill. After this mixing, the final mix was carried out on a two-roll mill by adding the curative (Dicup 40C) and mixing for three minutes. Following this final mix, the product was placed in the mold and cured at 170° C.

For comparison purposes, a commercially available hydrous zinc dimethacrylate (ZMA-P, Kawaguchi Kagaku Co., Ltd.) as well as a commercial form of zonc hydroxy monomethacrylate (Actor ZMA, Kawaguchi Kagaku Co., Ltd.) were employed. Each rubber compound contained 100 phr of polymer polybutadiene 40 phr of the salt, and 2 phr of Dicup 40C.

In the tables which follow, various comparisons are noted, including physical properties such as hardness, ball hardness, initial velocity, durability, and mixing and cure conditions. Cure data and physical properties reported hereinbelow are defined as follows:

JIS-A—(Japanese Industrial Standard) Comparable to ASTM Shore A

Ball Hardness—Amount of compression (in mm) of a golf ball when subjected to 100 kg strain (force)

Initial Velocity—Golf ball is struck at head speed of 45 meters/second and this is the velocity as the ball leaves the club at click.

Cure Time (T90)—This is the time to 90% total cure of the compound as measured on a curastometer from Japanese Synthetic Rubber (JSR). This instrument is comparable to a Monsanto Rheometer but is a rotorless type curometer.

Cure Time IDX—Time for temperature to reach a peak at the golf ball center during cure.

TABLE I

| Comparison Between Anhydrous Zinc Dimethacrylate and a Commercial Hydrous Form of Zinc Dimethacrylate (ZMA—P) | | |
|---|---|---|
| | Ex. No. 1 | Ex. No. 2 |
| Salt type | Anhydrous | Hydrous |
| Polymer | 100 | 100 |

TABLE I-continued

| Comparison Between Anhydrous Zinc Dimethacrylate and a Commercial Hydrous Form of Zinc Dimethacrylate (ZMA—P) | | |
|---|---|---|
| | Ex. No. 1 | Ex. No. 2 |
| Salt | 40 | 40 |
| Dicup 40C | 2 | 2 |
| Cure time (T90) | 6' 36" | 7' 48" |
| JIS-A Hardness | 93 | 81 |

The polymer and salt were mixed at 50° C. by mixing on a two-roll mill for 10 minutes. The curative (Dicup 40C) was then added and mixing continued for 3 minutes. The mixture was then placed in a mold and cured at 170° C. As can be noted in Table I, Example No. 1 had a shorter cure time and produced a harder final compound.

TABLE II

| Comparison Between Anhydrous Zinc Dimethacrylate and Zinc Hydroxy Monomethacrylate (Actor ZMA) | | |
|---|---|---|
| | Ex. No. 3 | Ex. No. 4 |
| Salt type | Anhydrous | Actor ZMA |
| Polymer | 100 | 100 |
| Salt | 40 | 40 |
| Dicup 40C | 2 | 2 |
| Cure Time (T90) | 6' 38" | 7' 06" |
| JIS-A Hardness | 93 | 92 |
| Ball Hardness | 2.35 | 3.46 |

The polymer and salt were mixed in a laboratory kneader for 6 minutes at 110° C. The mix was then placed on a two-roll mill, the Dicup 40C added and mixing continued for 3 minutes at 50° C. The product was placed in a mold and cured at 170° C. The results show that Example No. 3 cured in a shorter time and resulted in a harder ball.

TABLE III

| Comparison Between Anhydrous Zinc Dimethacrylate, Zinc Hydroxy Monomethacrylate and an In Situ Stock. | | | |
|---|---|---|---|
| | Ex. No. 5 | Ex. No. 6 | Ex. No. 7 |
| Salt type | Anhydrous | Actor ZMA | In Situ |
| Polymer | 100 | 100 | 100 |
| Salt | 40 | 40 | 13.7[a] 26.3[b] |
| Dicup | 2 | 2 | 2 |
| Mixing time | 10' | 10' | 60' |
| Cure Time IDX | 16.0' | 17.6' | 21.0' |
| Ball Hardness | 2.46 | 3.11 | 2.96 |
| Initial Velocity | 71.73 | — | 69.52 |

[a]ZnO
[b]Methacrylic Acid

In the above Examples No. 5 and 6, the polymer and salt were mixed in a laboratory kneader for 10 minutes at 70° C. The mix was then placed on a two-roll mill and the Dicup 40C added and mixing continued for 3 minutes at 50° C. For Example No. 7, the polymer and zinc oxide were placed in a laboratory kneader, the methacrylic acid was added and mixing was continued for 60 minutes at 70° C. The mixture was then placed on a two-roll mill, the Dicup 40C was added and mixing was continued for 3 minutes at 50° C. After mixing was complete, the products were placed in a mold and cured at 170° C. As can be noted from the above table, Example No. 5 had the shortest mix and cure time. the best ball hardness and the best initial velocity.

In conclusion, it should be clear from the foregoing examples and specification disclosure that the addition of anhydrous metal salts of $\alpha,\beta$-ethylenically unsaturated carboxylic acids, particularly zinc dimethacrylate to rubbery polymers, such as high cis polybutadiene, results in better processability of the rubber compound, reduced curing times, high velocity and greater hardness for golf balls produced therefrom, as compared to golf balls prepared from rubber compounds to which conventional, hydrated salts have been added. It is to be understood that the invention is not limited to the anhydrous zinc dimethacrylate and high cis polybutadiene exemplified herein or by the disclosure of other metal salts and typical rubber polymers provided herein, the examples having been provided merely to demonstrate practice of the subject invention. Those skilled in the art may readily select other anhydrous metal salts and/or rubbery polymers, according to the disclosure made hereinabove.

Thus, it is believed that any of the variables disclosed herein can readily be determined and controlled without departing from the scope of the invention herein disclosed and described. Moreover, the scope of the invention shall include all modifications and variations that fall within the scope of the attached claims.

We claim:

1. A solid golf ball, exhibiting improved hardness, durability and velocity, comprising:
    a vulcanizable rubber selected from the group consisting of natural rubber, synthetic rubbers and mixtures thereof; and
    from about 5 to 100 parts by weight of a reinforcing filler comprising an essentially anhydrous metal salt of an $\alpha,\beta$-ethylenically unsaturated carboxylic acid per 100 parts of said vulcanizable rubber, said salt having a crystalline structure consisting essentially of plates and fibers.

2. A solid golf ball, as set forth in claim 1, wherein said metal salt is selected from the group consisting of zinc, iron (II), copper (II) and the alkaline earth metals and said $\alpha,\beta$-ethylenically unsaturated carboxylic acid has from 3 to about 30 carbon atoms.

3. A solid golf ball, as set forth in claim 2, wherein said metal is zinc.

4. A solid golf ball, as set forth in claim 3, wherein said salt comprises zinc dimethacrylate.

5. A solid golf ball, as set forth in claim 4, having 10 to 70 parts by weight of said salt per 100 parts of said vulcanizable rubber.

6. A solid golf ball, as set forth in claim 5, having 20 to 60 parts by weight of said salt per 100 parts of said vulcanizable rubber.

7. A solid golf ball, as set forth in claim 6, having 40 parts by weight of said salt per 100 parts of said vulcanizable rubber.

8. A solid golf ball, as set forth in claim 7, wherein said rubber comprises cis 1,4-polybutadiene.

9. A solid golf ball, as set forth in claim 1, having 10 to 70 parts by weight of said salt per 100 parts of said vulcanizable rubber.

10. A solid golf ball, as set forth in claim 9, having 20 to 60 parts by weight of said salt per 100 parts of said vulcanizable rubber.

11. A solid golf ball, as set forth in claim 10, having 40 parts by weight of said salt per 100 parts of said vulcanizable rubber.

12. A solid golf ball, as set forth in claim 11, wherein said rubber comprises cis 1,4-polybutadiene.

* * * * *